2,813,904
ACID-ADDITION QUATERNARY SALTS AND METHODS OF PREPARING SAME

William A. Lott, Maplewood, and John Krapcho, Perth Amboy, N. J., assignors to Olin Mathieson Chemical Corporation, New York, N. Y., a corporation of Virginia No Drawing. Application May 12, 1955,
Serial No. 507,988

4 Claims. (Cl. 260—567.6)

This invention relates to, and has for its object, the provision of compounds containing both a quaternary group and an acid-addition group, and methods of preparing them.

The compounds of this invention are defined by the general Formula I:

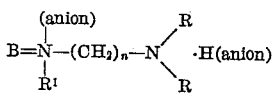

wherein each R is a member of the class consisting of hydrogen and lower alkyl; —N=B is a member of the class consisting of the diloweralkylamino, tetrahydroquinolino, pyrrolidino, piperidino and morpholino groups; $R^1$ is a member of the class consisting of alkyl and aralkyl groups; and $(CH_2)_n$ is an alkylene group containing three to twelve carbon atoms.

The compounds of this invention are useful as bactericides and/or surface active agents; in addition, the N,N,N',N',N'-penta-(lower alkyl)-alkylenediamine halide salts have hypotensive action and are especially valuable in the treatment of essential hypertension, being administrable for that purpose in the same manner and in the same formulations as the hypotensive agent hexamethonium bromide, with appropriate adjustment of dose to potency. Thus, the compound (6-dimethylaminohexyl) trimethyl ammonium bromide hydrobromide is substantially more active than the diacid-addition salt of N,N,N',N'-tetramethyl-1,6-hexanediamine, and better absorbed than the diquaternary compound, hexamethonium bromide; and it can be used to advantage by administration concurrently, or in association with, other hypotensive agents, such as *Rauwolfia serpentina* or a fraction thereof, as reserpine.

Among the preferred compounds of this invention are those in which $R^1$ is lower alkyl and the anion is a halogen.

The compounds of this invention may be prepared by the method which essentially comprises interacting a diamine of the general Formula II

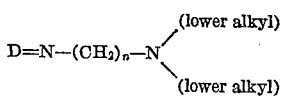

wherein D=N— is a member of the class consisting of the diloweralkylamino, aralkyl loweralkylamino, tetrahydroquinolino, pyrolidino, piperidino and morpholino groups, and $(CH_2)_n$ has the meaning given hereinbefore, with an acid (preferably one equivalent) to form a monoacid addition salt; and reacting said mono-acid addition salt (or a mixture of mono-acid addition and diacid-addition salt), preferably without isolation, with a quaternizing agent, $R_1$-(anion).

Utilizable diamines II includes inter alia: N,N,N',N'-tetraethyl-1,6-hexanediamine; N,N,N',N'-tetramethyl-1,6-hexane-diamine; N,N-dimethyl - N',N'-diisopropyl - 1,8-octanediamine; N,N,N'.N' - tetramethyl - 1,7 - heptanediamine; N,N,N',N'-tetramethyl - 1,12 - dodecanediamine; N,N,N',N'-tetraethyl - 1,10 - decanediamine; N,N,N',N'-tetraisobutyl - 1,3 - propanediamine; N,N,N',N'-tetrapropyl-1,6 - hexanediamine; N-[9-(N',N' - dimethylamino)-nonyl]morpholine; N - [6 - (N',N' - diisopropylamino)-hexyl]piperidine; N - [6-N',N' - diethylamino)hexyl]-pyrrolidine; N-[10-(N',N' - dimethylamino)decyl]piperidine; N-[5 - (N',N' - dimethylamino)pentyl]tetrahydroquinoline; N - [6-N',N'-diethylamino)hexyl]tetrahydroquinoline; N - [3-(N',N'-dimethylamino)propyl]tetrahydroisoquinoline; N-[4-(N',N' - diethylamino)butyl]tetrahydroisoquinoline; N,N,N'-trimethyl-N-benzyl-1,6 - hexanediamine; and N,N',N'triethylN - benzyl-1,8-octanediamine. Certain of these diamine reactants are described in the literature, and all may be obtained in a conventional manner, for example, by interacting a D=NH amine with an ω-haloalkylenenitrile, reducing the product, and reacting it with an alkyl halide in the presence of an alkaline condensing agent, such as sodamide; and preferably, when both lower alkyl groups are methyl, by reacting the reduced product with formaldehyde and formic acid (cf. Example 14).

Such acids as sulfuric, citric, tartaric, acetic, boric, nitric, phosphoric, gluconic and (especially) hydrohalic (hydriodic, hydrobromic or hydrochloric) can be used to prepare the corresponding mono-acid addition salts of the diamines II. Utilizable solvents for the reactants include acetone, acetonitrile, and lower alphatic alcohols, anhydrous or aqueous, such as ethyl alcohol and methyl alcohol.

Quaternizing agents $R^1$-anion utilizable in the described process include, inter alia, alkyl halides (for example, ethyl bromide, methyl iodide, octyl bromide, methyl chloride); dialkyl sulfates (for example, diethylsulfate, dimethylsulfate); aralkyl halides (for example, benzyl bromide, 1-p-methoxybenzyl chloride); and esters (for example, methyl p-toluene-sulfonate, ethyl α-bromopropionate, ethyl nitrate).

Alternatively, a monoquaternary ammonium salt of the general formula

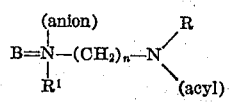

(wherein $R^1$, —N=B and $(CH_2)_n$ have the meaning given hereinbefore, and the acyl includes such groups as acetyl, propanoyl and benzoyl) is interacted with an acid (especially a hydrohalic), as defined hereinbefore; and a compound of the invention wherein at least one R is hydrogen is readily prepared.

Compounds of the invention I can also be prepared by the method which essentially comprises catalytic-hydrogenation of a diquaternary ammonium compound (III)

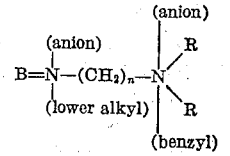

In this reduction, each R is preferably a lower alkyl group; and the reduction is preferably effected by treatment with hydrogen in the presence of a suitable catalyst (such as palladium black, copper chromite, Raney nickel and platinum dioxide), until the required amount of hydrogen has been absorbed. Advantageously, a carrier-supported catalyst such as palladium-charcoal, rhodium charcoal, or palladium barium sulfate is utilized. The catalytic hydrogenation may be effected at superatmospheric pressure (for example, about 2 or 3 atmospheres) and/or at slightly elevated temperatures. Utilizable diquaternary ammonium reactants III include inter alia: diamines,

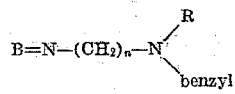

quaternized with an alkyl halide (such as ethyl bromide, methyl iodide), or a dialkyl sulfate (such as diethyl sulfate, dimethylsulfate).

Alternatively, the reactant base, such as II, can first be interacted with one equivalent of a quaternizing agent, as explained hereinbefore; and the resulting monoquaternary compound is then interacted with an acid.

The following examples are illustrative, but by no means limitative, of the invention.

EXAMPLE 1

*(6 - dimethylaminohexyl)trimethylammonium bromide, hydrobromide, monohydrate*

A solution of 131 g. of N,N,N',N'-tetramethyl-1,6-hexanediamine in 300 ml. of methanol is treated with one equivalent of hydrobromic acid (86 ml. of 8.85 N). After standing for two hours at room temperature, the solution is treated with a solution of 76 g. of methyl bromide in 200 ml. of methanol. The mixture is allowed to stand at room temperature overnight. The bulk of the solvent is distilled at atmospheric pressure and the remainder under reduced pressure to a brittle dry solid. This solid (251 g.) is refluxed with 500 ml. of absolute alcohol for thirty minutes, cooled, filtered and the insoluble material discarded (dihydrobromide salt of the starting material). The filtrate is diluted with about one liter of ether to yield a precipitate weighing about 76 g., M. P. about 175–178° C. This material is dissolved in 400 ml. of hot isopropyl alcohol, treated with Darco and filtered. The cooled filtrate yields about 70 g. of colorless product, (6-dimethylaminohexyl)trimethylammonium bromide hydrobromide monohydrate, M. P. about 175–178° C.

Use of a molar equivalent of sulfuric acid in Example 1, in place of hydrobromic acid, followed by an equivalent of dimethylsulfate in place of methyl bromide, yields (6-dimethylaminohexyl)trimethylammonium methylsulfate bisulfate.

Use of a molar equivalent N,N,N',N'-tetrapropyl-1,5-pentanediamine in place of N,N,N',N'-tetramethyl-1,6-hexanediamine in Example 1 yields (5-dipropylaminopentyl)dipropylmethylammonium bromide hydrobromide.

Use of a molar equivalent of N-(6-dimethylaminohexyl) pyrrolidine in place of N,N,N',N'-tetramethyl-1,6-hexanediamine in Example 1 yields N-(6-dimethylaminohexyl)-N-methylpyrrolidinium bromide hydrobromide.

EXAMPLE 2

*(10-dimethylaminodecyl)trimethylammonium bromide, hydrobromide*

(a) *10-dimethylaminodecanol.*—A solution of 40.5 g. of sodium iodide in 200 ml. of acetone is treated with 48.7 g. of 10-chlorodecanol and the mixture stirred and refluxed for three hours. The bulk of the solvent is distilled and the residue cooled and diluted with 25 ml. of water and the product extracted with ether. After drying over magnesium sulfate, the solvent is distilled and the residual 10-iododecanol (58 g.) is added to a solution of 54.5 g. dimethylamine in 150 ml. of benzene. The mixture is heated to 100° C. for eighteen hours in a closed vessel. After cooling, the mixture is treated with 75 ml. of water and then 75 g. of potassium carbonate. The product is extracted with ether and dried over magnesium sulfate. After evaporation of the solvent, the residue is fractionated to yield about 41.9 g. of colorless product, 10-dimethylaminodecanol, B. P. about 116–119° C. (1 mm.).

(b) *N-benzyl-N,N',N'-trimethyl-1,10-decanediamine.*—A cool solution of 40.9 g. of material described in part (a) in 200 ml. of benzene is treated dropwise with 48.0 g. of thionyl chloride, a heavy precipitate forms. The mixture is stirred and refluxed for four hours and the solvent removed under reduced pressure. In order to remove entrained thionyl chloride, the residue is treated with benzene and the solvent evaporated. The residue is cooled, dissolved in 25 ml. of water and treated with a solution of 30 g. of potassium carbonate in 30 ml. of water. The liberated 1-chloro-10-dimethylaminodecane is extracted with three 75 ml. portions of toluene and dried over magnesium sulfate for thirty minutes. The solution is filtered, treated with 73 g. of N-methylbenzylamine and then refluxed for eighteen hours, a heavy precipitate forms. The mixture is cooled and gradually treated with a solution of 65 ml. of concentrated hydrochloric acid in 75 ml. of water. The lower layer is separated and toluene layer washed with 25 ml. of water. The aqueous phases are combined, treated with a solution of 40 g. of sodium hydroxide in 60 ml. of water and the liberated base extracted with ether and dried over magnesium sulfate. After evaporation of the solvent, the residue is fractionated to yield three cuts. The product in the third cut distills at about 148–149° C. (0.2 mm.); yield about 15.5 g. When the first two fractions are combined and heated to reflux (190° C.) for five hours, a heavy precipitate separates from the reaction mixture. After cooling, the mixture is treated with a solution of 25 g. potassium carbonate in 25 ml. of water, the liberated base extracted with ether and dried over magnesium sulfate. The solvent is evaporated and the residue fractionated to yield about 45.1 g. of N-methylbenzylamine and an additional 17.7 g. of product, N-benzyl-N,N',N'-trimethyl-1,10-decanediamine; B. P. about 157–160° C. (0.5 mm.).

(c) *N' - benzyl - N,N,N,N',N' - pentamethyl - 1,10-decanediammonium bromide.*—A solution of 15.0 g. of the N-benzyl-N,N',N'-trimethyl-1,10-decanediamine in part (b) in 30 ml. of methanol is treated with 19.0 g. methyl bromide, dissolved in 40 ml. of methanol. After standing overnight at room temperature, the solution is diluted with ether to yield an oil which solidifies by trituration with ether; yield about 23.0 g.; M. P. 150–152° C. This material, N'-benzyl-N,N,N,N',N'-pentamethyl-1,10-decanediammonium bromide, is crystallized from 150 ml. of acetonitrile; yield about 20.7 g., M. P. about 153–154° C. (s. 150° C.).

(d) *(10-dimethylaminodecyl)trimethylammonium bromide, hydrobromide.*—A mixture of 10.0 g. of N'-benzyl-N,N,N,N',N'-pentamethyl-1,10-decanediammonium bromide from part (c), 3.0 g. of 5% palladium carbon and 100 ml. of absolute alcohol is placed in a Parr apparatus under fifty pounds of hydrogen. The theoretical quantity of hydrogen is consumed in thirty minutes. An additional 10.7 g. quantity of material is reduced in the same manner. The solutions are filtered and the combined filtrate diluted to about 600 ml. with ether to yield a colorless hygroscopic precipitate, (10-dimethylaminodecyl)trimethylammonium bromide, hydrobromide; yield about 15.4 g., M. P. about 202–204° C. After recrystallization from acetonitrile, the slightly hygroscopic product, (10 - dimethylaminodecyl)trimethylammonium bromide, hydrobromide, weighs about 13.0 g., M. P. about 202–204° C.

Use of a molar equivalent of N-benzyl-N,N',N'-trimethyl-1,6-hexanediamine (see Example 14) in place of N-benzyl-N,N',N'-trimethyl-1,10-decanediamine in section (c) of Example 2 ultimately yields the compound of Example 1.

Use of a molar equivalent of N-[5-(N'-benzyl-N'-methylamino)pentyl]pyrrolidine in place of N-benzyl-N,N',N'-trimethyl-1,10-dicanediamine in section (c) of Example 2 yields N-[5-(N'-benzyl-N'-methylamino)-pentyl]-1-methylpyrrolidinium bromide methobromide and, ultimately, N-[5-dimethylaminopentyl]-1-methylpyrrolidinium bromide hydrobromide.

Use of a molar equivalent of ethyl chloride in place of methyl bromide in section (c) of Example 2 yields N,N,-N' - trimethyl - N,N' - diethyl - N' - benzyl - 1,10 - decanediammonium chloride and, ultimately, (10-ethylmethylaminodecyl)dimethylethylammonium chloride, hydrochloride.

EXAMPLE 3

*(6-aminohexyl)trimethylammonium bromide, hydrobromide*

(a) *ω-Dimethylaminocapronitrile.*—A solution of 120 g. of sodium iodide in 350 ml. of acetone is treated with 93.4 g. of ω-chloro capronitrile and the mixture refluxed for three hours. The bulk of the solvent is distilled, the residue cooled and treated with 150 ml. of water. The product is extracted with ether and dried over magnesium sulfate. After evaporation of the solvent, the residual ω-iodocapronitrile is added to a cool solution of 106 g. of dimethylamine in 300 ml. of benzene. The reaction is exothermic. After standing overnight, the mixture is refluxed for two hours and cooled. The organic phase is decanted from the crystalline dimethylamine hydroiodide and gradually treated with 70 ml. of concentrated hydrochloric acid. The resulting acidic solution is cooled and basified with a solution of 40 g. of sodium hydroxide in 80 ml. of water. The liberated base is extracted with ether and dried over magnesium sulfate. After evaporation of the solvent, the residue is fractionated to yield about 68.8 g. of colorless product, ω-dimethylaminocapronitrile; B. P. about 94–96° C. (7 mm.).

(b) *N,N-dimethyl-1,6-hexanediamine.*—A stirred suspension of 28.0 g. of lithium aluminum hydride in 1 liter of ether is treated dropwise with 134.0 g. of ω-dimethylaminocapronitrile from part (a). The resulting mixture is stirred and refluxed for seven hours, cooled and treated with a solution of 7 g. of sodium hydroxide in 170 ml. of water. The mixture is filtered and the insoluble inorganic material washed well with ether. After drying the filtrate over magnesium sulfate, the solvent is distilled and the residue fractionated to yield about 84.2 g. of colorless product, N,N-dimethyl-1,6-hexanediamine; B. P. about 103–107° C. (23 mm.).

(c) *6-acetylaminohexyldimethylamine.*—A solution of 43.2 g. of N,N-dimethyl-1,6-hexanediamine from part (b) in 300 ml. of benzene is stirred and treated dropwise with a solution of 23.6 g. of acetyl chloride in 100 ml. of benzene. The resulting mixture is refluxed for two hours, cooled and treated with a solution of 15 ml. of concentrated hydrochloric acid in 150 ml. of water. The organic layer is then extracted with 60 ml. of water, the aqueous layers are combined and treated with a solution of 60 g. of sodium hydroxide in 60 ml. of water. The liberated base is extracted with a mixture of ether and chloroform and dried over magnesium sulfate. After evaporation of the solvent, the residue is fractionated to yield about 49.5 g. of colorless distillate, 6-acetylaminohexyldimethylamine; B. P. about 120–122° C. (0.3 mm.).

(d) *(6 - acetylaminohexyl)trimethylammonium bromide.*—A solution of 20.0 g. (0.117 mole) of 6-acetylaminohexyldimethylamine from part (c) in 50 ml. of acetone is treated with a solution of 15.5 g. (0.163 mole) of methyl bromide in 62 ml. of acetone. An oil immediately separates and gradually becomes solid. After standing at room temperature overnight, the product is filtered and dried; yield about 29.7 g., M. P. about 129–131° C. This material is crystallized from 50 ml. of acetonitrile-50 ml. of acetone; yield about 28.1 g., (6-acetylaminohexyl)trimethylammonium bromide, M. P. about 129–131° C.

(e) *(6 - aminohexyl)trimethylammonium bromide, hydrobromide.*—A mixture of 20.0 g. of (6-acetylaminohexyl)trimethylammonium bromide from part (d) in 40 ml. of water is treated with 20 ml. of 48% hydrobromic acid. After the solution is allowed to stand at room temperature overnight, it is refluxed for one hour. The solvent is removed under reduced pressure and the residue dissolved in about 30 ml. of absolute alcohol and the solvent evaporated under reduced pressure. This operation is repeated three times in order to remove last traces of water from the residue. The latter is dissolved in 100 ml. of absolute alcohol, treated with Darco, filtered and the filtrate diluted with 300 ml. of ether. After cooling, the colored mother liquor is decanted from the amorphous solid and the latter treated with 100 ml. of hot acetonitrile. The mixture is cooled and the colorless product filtered and dried; yield about 17.0 g., M. P. about 158–160° C. After recrystallization from 30 ml. of absolute alcohol–30 ml. of acetonitrile, the product, (6-aminohexyl)trimethylammonium bromide, hydrobromide, weighs about 13.3 g., M. P. about 158–160° C.

EXAMPLE 4

Use of a molar equivalent of N-(6-acetylaminohexyl)-N-methylpiperidinium chloride in place of (6-acetylaminohexyl)trimethylammonium bromide in section (e) of Example 3 yields N-(6-aminohexyl)-N-methylpiperidinium chloride hydrochloride.

EXAMPLE 5

Use of a molar equivalent of N,N,N',N'-tetraethyl-1,12-dodecanediamine in place of N,N,N',N'-tetramethyl-1,6-hexanediamine in Example 1 yields (12-diethylaminododecyl)triethylammonium bromide hydrobromide.

EXAMPLE 6

*(6 - ethylaminohexyl)trimethylammonium bromide hydrobromide*

(a) *N,N - dimethyl - N' - ethyl - 1,6 - hexanediamine.*—A solution of 23.5 g. of 6-acetylaminohexyldimethylamine from Example 3, part (c) in 50 ml. is added dropwise to a suspension of 4.6 g. of lithium aluminum hydride. The resulting mixture is refluxed for four hours, cooled and treated with a solution of 2 g. of sodium hydroxide in 26 ml. of water. The mixture is filtered and the insoluble inorganic material washed well with ether. After drying the filtrate over magnesium sulfate, the solvent is evaporated and the residue fractionated to yield about 14.2 g. of colorless product N,N-dimethyl-N'-ethyl-1,6-hexanediamine; B. P. about 95–97° C. (7 mm.).

(b) *(6 - ethylacetylaminohexyl)dimethylamine.*—Interaction of 13.6 g. of N,N-dimethyl-N'-ethyl-1,6-hexanediamine from part (a) with 6.2 g. of acetyl chloride in benzene solution according to the procedure described in Example 3, part (c), yields about 12.5 g. of colorless product (6-ethylacetylaminohexyl)dimethylamine; B. P. about 110–112° C. (0.3 mm.).

(c) *(6 - ethylacetylaminohexyl)trimethylammonium bromide.*—A solution of 11.4 g. of (6-ethylacetylaminohexyl)dimethylamine from part (b) in acetone is treated with a solution of 7.6 g. of methyl bromide in 15 ml. of acetone. After standing at room temperature for several days, the mixture is treated with 100 ml. of ether and the product, (6-ethylacetylaminohexyl)trimethylammonium bromide, filtered and dried; yield about 16.1 g.; M. P. about 119–121° C. (Recrystallization from a butanone-acetonitrile does not change the melting point.)

(d) *(6 - ethylaminohexyl)trimethylammonium bromide, hydrobromide.*—A solution of 15.1 g. of (6-ethylacetylaminohexyl) trimethylammonium bromide from part (c) in 30 ml. of water is treated with 15 ml. of 4.8% hydrobromic acid. The mixture is refluxed for one hour and the solvent then removed under reduced pressure. The residue is dissolved in 25 ml. of absolute alcohol and the solvent removed under reduced pressure to yield an oily residue which solidifies after evacuation in a desiccator.

EXAMPLE 7

Use of a molar equivalent of (6-ethylacetylaminohexyl) dimethylbenzylammonium chloride in place of (6 - ethylacetylaminohexyl)trimethylammonium bromide in section (d) of Example 6 yields, when treated with hydrochloric acid, (6-ethylaminohexyl) dimethylbenzylammonium chloride hydrochloride.

EXAMPLE 8

(5-aminopentyl)trimethylammonium bromide, hydrobromide.—Replacement of ω-chlorocapronitrile in Example 3, part (a) by δ-chlorovaleronitrile yields δ-dimethylaminovaleronitrile; B. P. about 73° C. (8 mm.). Reduction of the latter compound by lithium aluminum hydride according to the procedure described in Example 3, part (b) yields N,N-dimethylcadaverine; B. P. about 49–50° C. (7 mm.). Treatment of the latter compound with acetyl chloride in the same manner described in Example 3, part (c) yields 5-acetylaminopentyldimethylamine, which on treatment with methyl bromide yields (5-acetylaminopentyl)trimethylammonium bromide. Hydrolysis of the latter compound with hydrobromic acid yields (5-aminopentyl)trimethylammonium bromide, hydrobromide.

EXAMPLE 9

(6-aminohexyl)-1 - methylpyrrolidinium bromide, hydrobromide.—Replacement of dimethylamine in Example 3, part (a) with pyrrolidine yields ω-pyrrolidinocapronitrile. Reduction of this compound with lithium aluminum hydride yields N-(6-aminohexyl) pyrrolidine. Reaction of the latter compound with acetyl chloride yields N-(6-acetylaminohexyl)pyrrolidine. Treatment of the material with methyl bromide yields N-(6-acetylaminohexyl)-N-methylpyrrolidinium bromide, which on hydrolysis with hydrobromic acid yields N-(6-aminohexyl)-N-methylpyrrolidinium bromide hydrobromide.

EXAMPLE 10

Use of a molar equivalent of N,N,N',N'-tetramethyl-1,9-nonanediamine in place of N,N,N',N'-tetramethyl-1,6-hexanediamine in Example 1 yields (9-dimethylaminononyl)trimethylammonium bromide hydrobromide.

EXAMPLE 11

Use of N,N,N,N',N'-pentamethyl-N'-benzyl - 1,3-propanediammonium bromide in part (d) of Example 2 in place of N'-benzyl-N,N,N,N',N'-pentamethyl - 1,10 - decanediammonium bromide yields (3-dimethylaminopropyl)trimethylammonium bromide hydrobromide.

EXAMPLE 12

Use of tetrahydroquinoline in place of dimethylamine in Example 3 yields N-(6-aminohexyl)-N-methyltetrahydroquinolinium bromide hydrobromide.

EXAMPLE 13

Use of N-[6-(N'-benzyl-N'-methylamino)hexyl]tetrahydroisoquinoline in place of N-benzyl - N,N',N'-trimethyl-1,10-decanediamine in section (c) of Example 2 yields N - [6 - (N'-benzyl - N'-methylamino)hexyl] - N-methyltetrahydroisoquinolinium bromide methobromide and ultimately, N-[6-dimethylaminohexyl]-N-methyltetrahydroisoquinolinium bromide, hydrobromide.

EXAMPLE 14

(6-dimethylaminohexyl)trimethylammonium bromide, hydrobromide (a) ω-(N-benzyl- N - methylamino)capronitrile.—99.4 g. ω-chlorocapronitrile is converted to the corresponding ω-iodocapronitrile as described in part (a) of Example 3. The iodo compound is dissolved in 100 ml. of toluene and added to a solution of 175 g. of benzylmethylamine in 400 ml. of toluene. The mixture is stirred and refluxed for ten hours, cooled and treated with a solution of 83 ml. of concentrated hydrochloric acid in 100 ml. of water. The aqueous phase is separated and treated with a solution of 80 g. of sodium hydroxide in 160 ml. of water. The liberated base is extracted with ether and dried over magnesium sulfate. After evaporation of the solvent, the residue is fractionated to yield about 135 g. of product, ω-(N-benzyl-N-methylamino)capronitrile; B. P. about 128–132° C. (1 mm.).

(b) N-benzyl-N - methyl-1,6-hexanediamine.—A solution of 135 g. of ω-(N-benzyl-N-methylamino)capronitrile from part (a) in 100 ml. of ether is added dropwise to a stirred suspension of 18.7 g. of lithium aluminum hydride in 500 ml. of ether. After completion of the addition, the mixture is stirred and refluxed for eight hours. The mixture is cooled and treated cautiously with 27 ml. of water and there is then added a solution of 5.3 g. of sodium hydroxide in 80 ml. of water. The suspension is stirred for an hour, filtered and the insoluble material washed well with ether. The filtrate is dried over magnesium sulfate. After evaporation of the solvent, the residue is fractionated to yield about 76.5 g. of colorless product, N-benzyl-N-methyl-1,6-hexanediamine; B. P. about 129–131° C. (1 mm.).

(c) N-benzyl-N,N',N'-trimethyl-1,6- hexanediamine.—To 28 ml. of cold formic acid (90%) is added in portions 33 g. of N-benzyl-N-methyl-1,6-hexanediamine, described in part (b) of Example 14. The mixture is treated with 68 ml. of 37% formaldehyde and allowed to stand overnight at room temperature. The mixture is heated for eight hours on a steam bath, cooled and treated with a solution of 60 g. of sodium hydroxide in 100 ml. of water. The product is extracted with ether and dried over potassium carbonate. After evaporation of the solvent, the residue is fractionated to yield about 30.3 g. of product, N-benzyl-N,N',N'-trimethyl-1,6-hexanediamine; B. P. about 123–126° C. (1 mm.).

(d) N-benzyl-N,N,N',N',N'-pentamethyl-1,6 - hexanediammonium bromide.—A solution of 30 g. of material from part (c) of Example 14 in 100 ml. of absolute alcohol is cooled and treated with a solution of 38 g. of methyl bromide in 60 ml. of acetone. The mixture is allowed to stand at room temperature for three days, and the crystalline product is filtered and washed with acetone; yield about 40.0 g., M. P. about 170–175° C. After recrystallization from isopropyl alcohol, the colorless product, N-benzyl-N,N,N',N',N'-pentamethyl - 1,6 - hexanediammonium bromide, melts at about 173–176° C.

(e) (6-dimethylaminohexyl)trimethylammonium bromide, hydrobromide.—Reduction of N-benzyl-N,N,N',N',N'-pentamethyl-1,6-hexanediammonium bromide prepared in (d) above, according to the procedure described in part (d) of Example 2, yields a colorless solid, (6-dimethylaminohexyl)trimethylammonium bromide, hydrobromide, which is purified by crystallization from isopropyl alcohol.

The invention may be variously otherwise embodied within the scope of the appended claims.

We claim:

1. The method for preparing a compound of the general formula

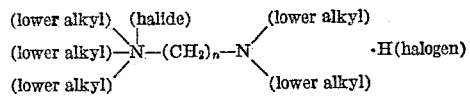

wherein (CH₂)ₙ is an alkylene group containing three to twelve carbon atoms and the halide and halogen radicals are each a member of the class consisting of chloro, bromo and iodo groups, which comprises catalytic-hydrogenating at superatmospheric pressure a diquarternary ammonium compound of the general formula

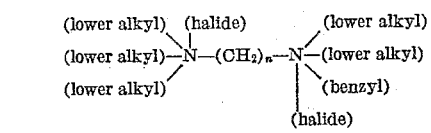

wherein (CH₂)ₙ and halide are as above defined, in the presence of a catalyst of the class consisting of palladium black, copper chromite, Raney nickel platinum dioxide, palladium-charcoal, rhodium charcoal, and palladium barium sulfate, and recovering the resultant amine product.

2. A compound of the general formula

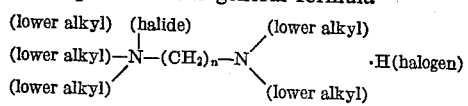

wherein $(CH_2)_n$ is an alkylene group containing three to twelve carbon atoms, and the halide and halogen radicals are each a member of the class consisting of chloro, bromo and iodo groups.

3. (6 - dimethylaminohexyl)trimethylammonium bromide, hydrobromide.

4. (10-dimethylaminodecyl)trimethylammonium bromide, hydrobromide.

References Cited in the file of this patent

UNITED STATES PATENTS 1,005,217  Hofmann et al. _____ Oct. 10, 1911

FOREIGN PATENTS 695,217  Germany _____ Aug. 20, 1940

OTHER REFERENCES

Von Braun: "Liebigs Annalen," vol. 386 (1912), pp. 277–84.

Von Braun: "Ber. Deut. Chem.", vol. 43 (1910), pp. 2876–79.

Wedekind: "Ber. Deut. Chem.", vol. 49 (1916), pp. 937–41.

Hanhart et al.: "J. Chem. Soc." (London), 1927, pp. 1010–18.

Ingold: "J. Chem. Soc." (London), 1931 pp. 1669–83.

Barber et al.: "J. Pharm. and Pharmacol.", vol. 3, 1951, pp. 663–69.

Beilstein: "Organische Chemie.", vol. 4, 1st suppl. (1929) pp. 421–22; vol. 4, 2nd suppl. (1942), p. 702.